United States Patent [19]

Williams

[11] Patent Number: 4,702,728
[45] Date of Patent: Oct. 27, 1987

[54] MACHINE TOOL SHAFT DRIVE SYSTEM

[75] Inventor: Colin W. F. Williams, Horsham, England

[73] Assignee: Systems Efficiency Limited, England

[21] Appl. No.: 689,008

[22] Filed: Mar. 1, 1985

[30] Foreign Application Priority Data

Jan. 6, 1984 [GB] United Kingdom ............... 8400312

[51] Int. Cl.$^4$ ............................................. F16H 7/02
[52] U.S. Cl. ................................... 474/148; 474/149
[58] Field of Search ............... 474/149, 58, 148, 115; 74/840; 408/128, 130

[56] References Cited

U.S. PATENT DOCUMENTS

| 2,183,258 | 12/1939 | Harman | 474/58 |
| 2,300,046 | 10/1942 | Harwood | 408/128 X |
| 3,534,634 | 10/1970 | Kawanami | 474/115 X |
| 3,837,291 | 9/1974 | Umlor | 474/148 X |
| 3,838,934 | 10/1974 | Petroff | 408/130 X |

Primary Examiner—Stephen J. Novosad
Assistant Examiner—Thuy M. Bui
Attorney, Agent, or Firm—Bacon & Thomas

[57] ABSTRACT

A machine tool with one or more axially movable tool-carrying spindles is provided with a drive system for transferring drive to the spindle(s) from a driving shaft parallel to the spindle(s). The driving shaft, e.g. a motor shaft, carries a plain cylindrical pulley and driven pulley(s) are provided on the driven spindle(s). A poly-vee belt is entrained around the pulleys and the or each driven pulley is formed with an outer surface shaped to enter at least one of the grooves of the poly-vee belt. In use the driven spindle(s) may be moved axially relative to the driving shaft; the belt is retained by the driven pulley(s) and rides axially along the surface of the driving pulley. The drive system allows rapid axial movement without vibration or overshoot and provides high traction. It has particular utility in high speed drilling and routing machines and the like.

11 Claims, 6 Drawing Figures

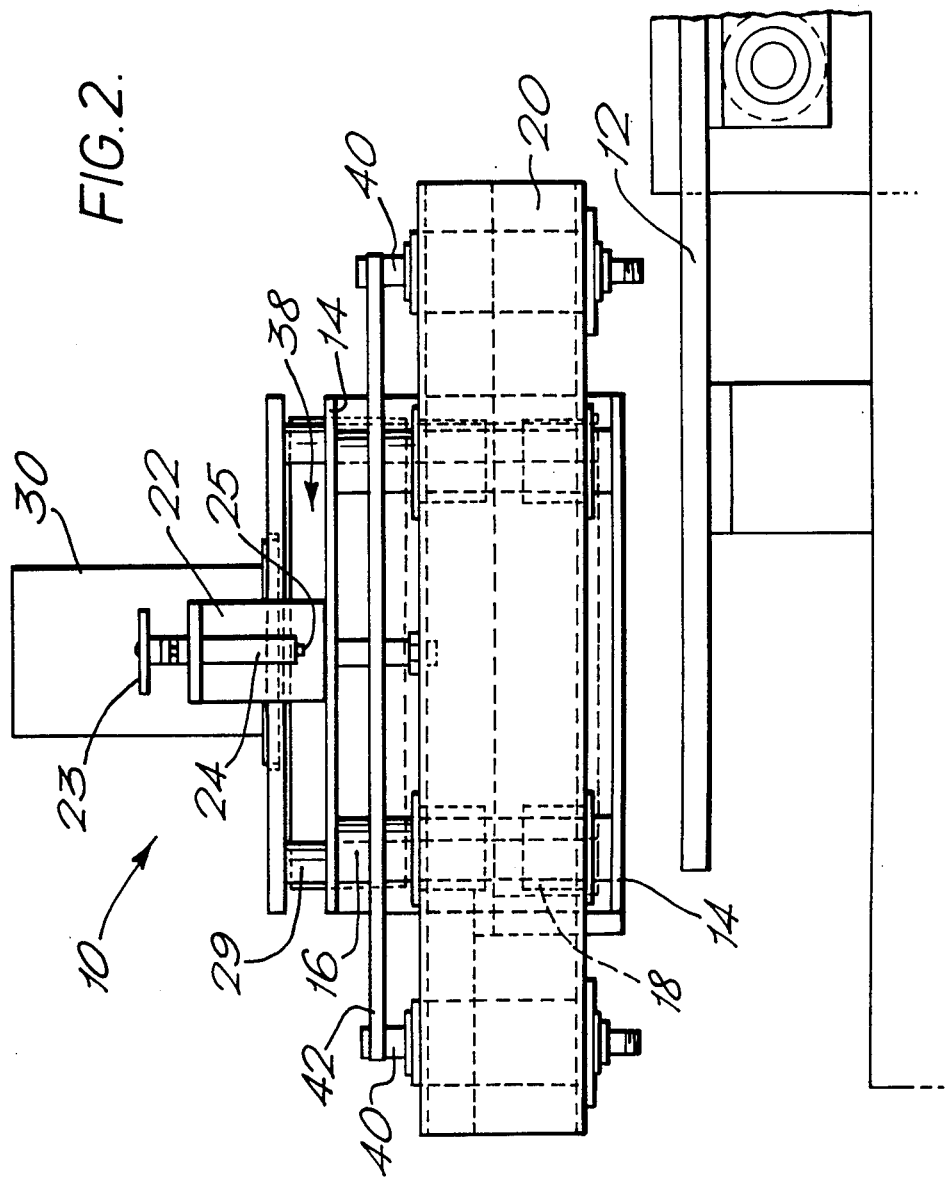

MACHINE TOOL SHAFT DRIVE SYSTEM

This invention relates to a drive system for transferring drive from a driving shaft to one or more parallel driven shafts where the or each driven shaft is movable along its axis. Such drives are used in machines, such as drilling and routing machines, in which a rotating tool is driven towards and away from a workpiece.

In a known drive system in machine tools an electric drive motor carrying a driving pulley on its shaft and a driven spindle carrying a driven pulley at one end and a tool at the other end are mounted on a mounting and are movable as a whole in a vertical direction, i.e. parallel to the spindle and motor shaft axes. Such an arrangement has the disadvantage that relatively massive bearings must be provided for movement of the mounting, and substantial drive components, such as a pneumatic jack, must be provided. Further, the speed of vertical displacement of the tool is limited because of the high mass which must be moved with it.

A possible alternative arrangement would be to make only the driven shaft(s) axially movable and to provide a belt drive which allows relative axial movement between the driving and driven shafts, such as pulleys at least one of which is of sufficient axial length to allow the belt to ride along it during axial movement of the shaft(s). This arrangement has the disadvantage that, particularly during rapid axial movements, the belt tends to wander or overshoot along the pulley and this leads to increased friction, wear and vibration, all of which may be serious at high rotational speeds.

It is an object of the invention to provide a drive system which is capable of providing high speed drive with relatively low losses and low vibration and which permits rapid axial movement of the driven shaft.

According to the invention, there is provided a shaft drive system comprising a driving pulley providing a cylindrical outer surface, a driven shaft carrying a driven pulley and being axially movable with respect to the driving pulley, and a poly-vee belt drivingly coupling the driving and driven pulleys, the driven pulley being formed with an outer surface shaped to enter at least one of the grooves of the poly-vee belt. Such a system provides an efficient drive which is quiet and vibration-free, requires no maintenance and is simple and economical to construct. The driven pulley may be separately formed and attached to the driven shaft but preferably it is formed integrally with the shaft, e.g. by machining at least one peak or a series of peaks and grooves on the shaft.

The driving pulley may be provided with flanges at the axial limits of the cylindrical surface, but this is not necessary. It has surprisingly been found that even during very rapid movement of the driven shaft, the poly-vee belt does not overshoot in its axial movement along the cylindrical surface. Furthermore, although poly-vee belts are not intended or recommended for use on a plain cylindrical pulley, and indeed have only small areas of contact with such a pulley, we have found that adequate traction can be provided and indeed that the traction is similar to that provided by a flat belt of equivalent width.

The invention extends to a machine tool incorporating a drive system as defined above.

An embodiment of the invention will now be described by way of example and with reference to the accompanying drawings, in which:

FIG. 2 is a front elevation of the router of FIG. 1;

Figure 1:
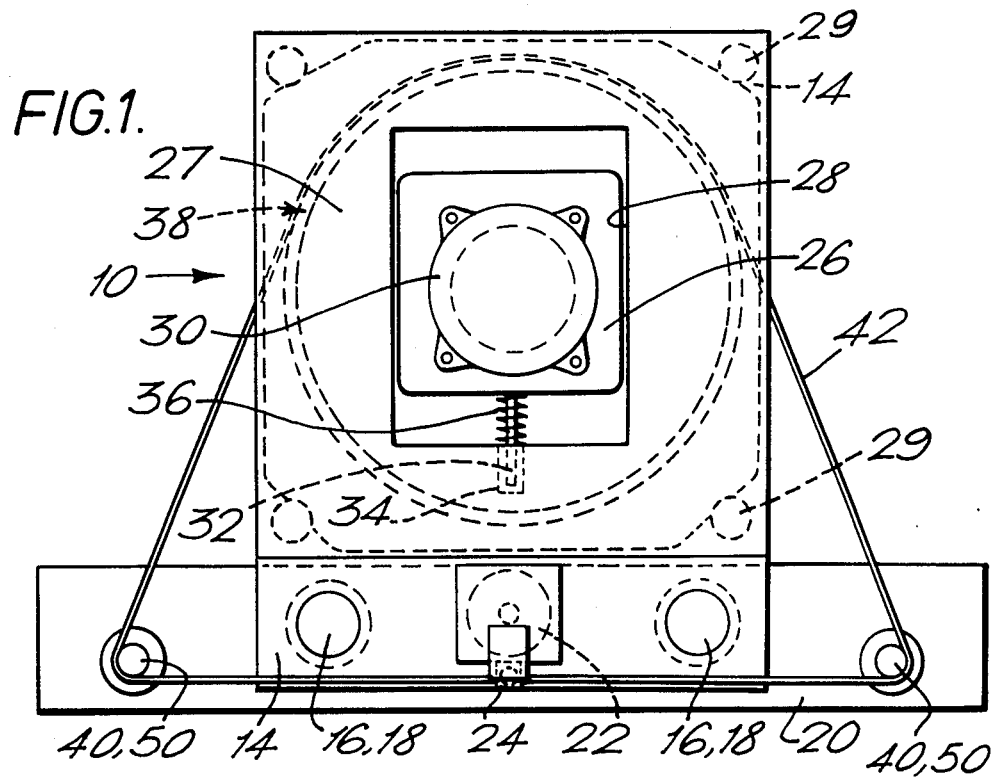
FIG. 1 is a plan view of a router according to the invention.

Referring to the drawings, the drive system of the present embodiment is applied to a two-axis, two-spindle high speed router 10. The machine 10 comprises a bed 12 which may be moved in the horizontal Y-direction through a ball leadscrew under the control of a computer. In use the bed 12 carries a workpiece. Mounted above the bed 12 is an X-axis carriage assembly 14 which is movable in the horizontal X-direction again through a ball leadscrew under the control of the computer. Mounted on the X-axis carriage assembly 14 by bearing pillars 16 and bushes 18 is a Z-axis beam 20. The beam 20 is movable vertically on the bearing pillars 16 under the influence of a double acting air cylinder 22 which is provided with an adjustable hydraulic check unit 24 for controlling the down feed rate. The air cylinder 22 is mounted on the X-axis carriage assembly and its piston rod extends therethrough and is connected to the Z-axis beam. Alternative drive means could be employed, such as hydraulic or electrical drives.

A motor mount 26 is mounted on a mounting plate 27 via p.t.f.e. slides 20 and carries an electric drive motor 30. Plate 27 is mounted on the X-axis carriage assembly via four pillars 29. A rod 32 is fixed to the mount 26 and enters a guide hole 34 in the mounting plate 27. A disc spring 36 is provided to urge the mount 26 towards the rear of the machine. Mounted below the motor mount 26 on the motor shaft is a motor pulley 38 which will be described in more detail with reference to FIG. 3. A pair of spindle shafts 40 are rotatably mounted in the Z-axis beam 20 by means of respective bearings. The spindles will be described in more detail with reference to FIGS. 4 and 5. The upper ends of the spindles 40 are formed with grooves 52 for receiving and locating a poly-vee belt of the same profile. The lower end of each spindle is provided with a thread and collet arrangement for mounting a routing tool. A poly-vee belt 42 surrounds and engages the motor pulley 38 and the spindles 40.

Figure 3:
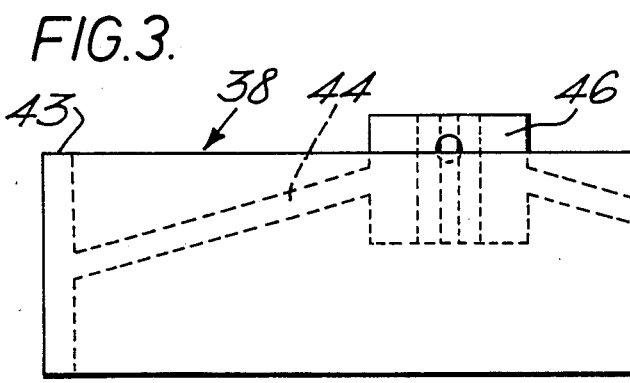
FIG. 3 is a side view of the motor pulley of the machine of FIGS. 1 and 2.

As may be seen in FIG. 3 the outer surface of the driving or motor pulley 38 is cylindrical. The pulley comprises a casting consisting of a cylindrical circumferential portion 43, a conical web 44 and an axially offset hub 46. The offset hub allows the pulley 38 to be mounted to the motor shaft whilst having adequate clearance below the motor mount. The motor pulley diameter is typically 327 mm.

Figure 4:
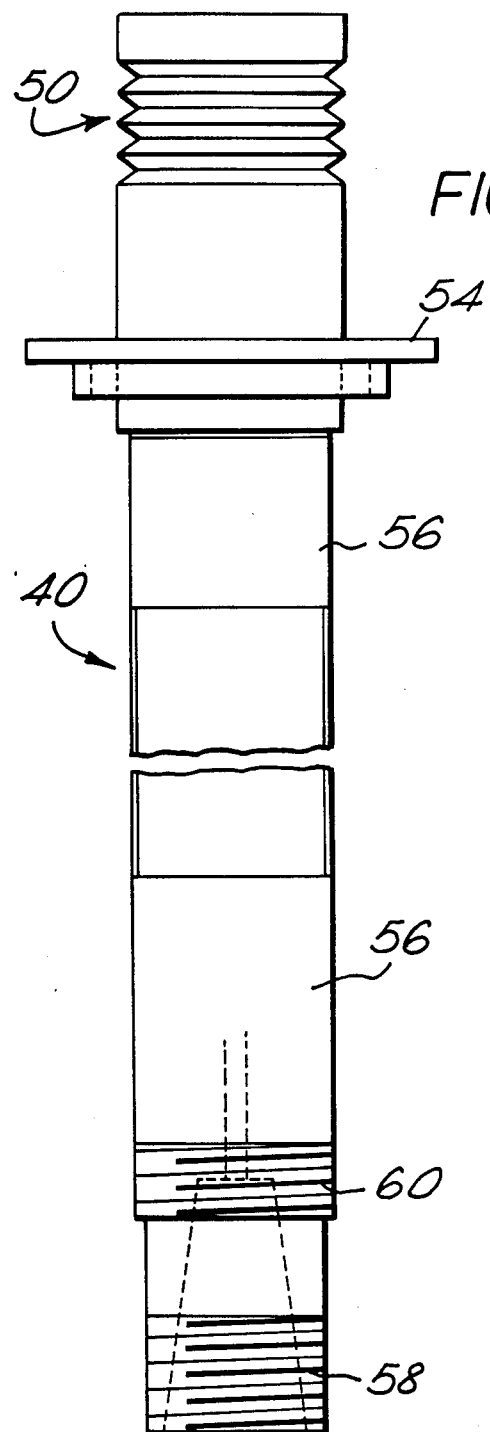
FIG. 4 is a side view of one of the spindles of the machine.
Figure 5:
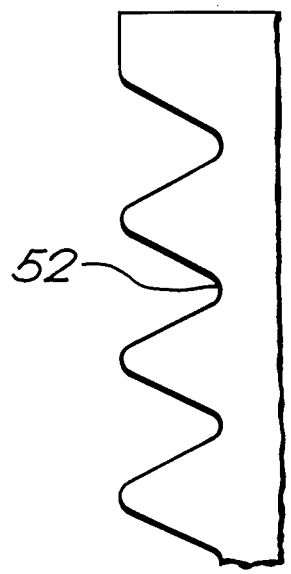
FIG. 5 is a detailed view showing the cross-section of the grooves of the driven pulley provided on the spindle of FIG. 4.
Figure 6:
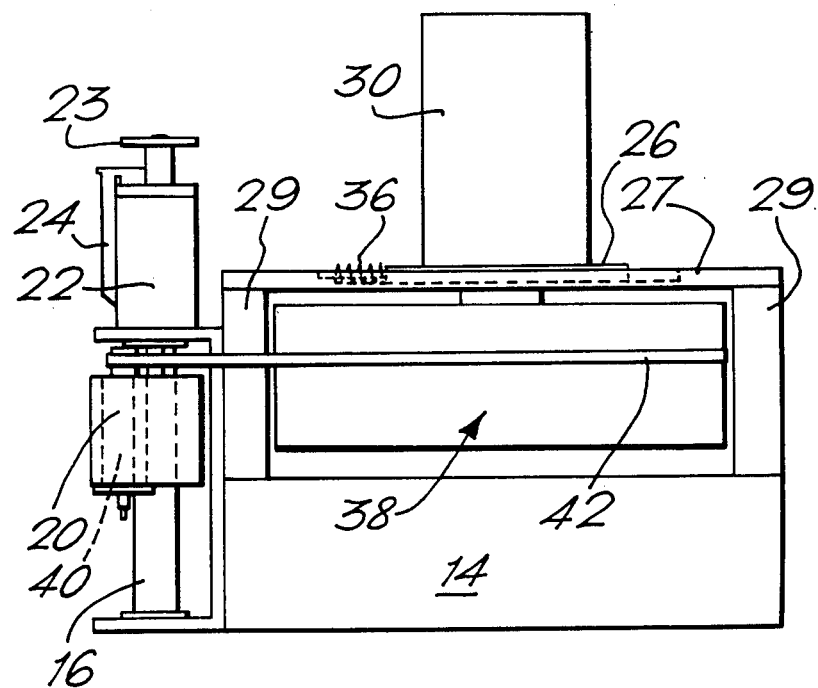
FIG. 6 is a side view taken from the right hand side of FIGS. 1 and 2.

Referring to FIGS. 4 and 5, the spindle shaft is provided with a pulley portion 50 of diameter typically 20 mm. The pulley portion 50 is formed with grooves 52, for example 1.92 mm deep and 2.34 mm apart. Poly-vee belts are made to a high accuracy and the tolerances in these measurements may for example be ±0.15 mm and ±0.03 mm, respectively. Mounted on the spindle shaft is a labyrinth seal 54 and the shaft is formed with two cylindrical surfaces 56 to be received in respective bearings. A thread 58 is provided for receiving a collet retaining nut for receiving a tool in a conventional manner. Thread 60 receives an assembly nut for retaining the spindle shaft in its bearings. In the assembled position a pair of concentric spacer tubes extend between the bearings, a further seal is provided below the lower bearing and a retainer nut is assembled on the thread 60. A lower plate bolted to the Z-axis beam holds the bearings and entire spindle shaft assembly in the Z-axis beam. The spindle 40 is thus rotatably mounted in the Z-axis beam 20. Any suitable alternative high speed spindle bearing may be used to rotatably mount the spindle 40 in the Z-axis beam 20.

Referring again to FIGS. 1 and 2, the spring 36 provides a high force with a linear action and serves to tension the poly-vee belt. In use, the electric drive motor 30 is started and this causes the spindles 40 to be driven via the motor pulley 38, the poly-vee belt 42 and the driven pulleys 50. Typically a two-speed motor will be used providing spindle speeds of 24,000 and 48,000 r.p.m. When it is desired to lower the tools into the workpiece a solenoid air control is actuated (the air control is provided with interlocks so that the spindles cannot be lowered or raised unless they are rotating) and the piston rod of the cylinder 22 extends. The rate of movement is controlled by the hydraulic check unit 24 which is provided with an adjuster 25. The lower limit of travel is controlled by an adjustable stop 23. As the piston rod extends it moves the Z-axis beam 20 down the bearing pillars 16 and the tools engage the workpiece. During this movement the poly-vee belt 42 is maintained horizontal by the engagement of the grooves 52 with the belt and the belt rides down the cylindrical outer surface of the motor pulley 38.

It has been found that during this movement no noticeable wandering or overshoot occurs. The upstroke of the piston is not restricted by the hydraulic check unit 24 and typically two inches are travelled in about 500 milliseconds. Even after this movement there is no noticeable overshoot. It has been found that adequate traction is provided by the peaks of poly-vee belt running on the cylindrical surface of the pulley 38; in fact I have found that the traction is very similar to that of an equivalent width flat belt and it is thought that this is because the small areas of contact are under more pressure than the relatively large area of a typical flat belt.

Whilst the machine described operates with vertically-moving spindles, any other orientation may be employed with the drive system of the invention. For example, the system could be applied to a machine with horizontal spindles. Further, any number of spindles, including one, may be driven by a drive system according to the invention.

What is claimed is:

1. A hig speed shaft drive system useful, for example, for drilling and routing applications at speeds on the order of 24000–48000 rpm, comprising a driving pulley providing a cylindrical outer surface, a driven shaft carrying a driven pulley and being axially movable with respect to the driving pulley, and a poly-vee belt drivingly coupling the driving and driven pulleys, the driven pulley being formed with an outer surface shaped to enter at least one of the grooves of the poly-vee belt.

2. A shaft drive system as claimed in claim 1 wherein the driven pulley is formed integrally with the driven shaft.

3. A shaft drive system as claimed in claim 2 wherein the driven pulley is formed by machining a series of peaks and grooves on the driven shaft.

4. A shaft drive system as claimed in claim 1 wherein the driving pulley is formed without flanges at the axial limits of the cylindrical surface.

5. A shaft drive system as claimed in claim 1 wherein the driving pulley comprises a casting consisting of a cylindrical circumferential portion, an axially offset hub and a conical web joining the cylindrical portion and hub.

6. A shaft drive system as claimed in claim 1 having two driven shafts carrying respective driven pulleys, the driven shafts being mounted for axial movement together.

7. A high speed machine tool such as, for example, a drilling or routing tool, comprising:
   a motor driving a driving pulley having a cylindrical outer surface;
   at least one driven shaft adapted to carry a tool at one end and carrying a driven pulley at the other end and being axially movable with respect to the driving pulley, and
   a poly-vee belt drivingly coupling the driving and driven pulleys, the or each driven pulley being formed with an outer suface shaped to enter at least one of the grooves of the poly-vee belt, whereby said motor, driving pulley, driven shaft and belt are useful for applications at speeds on the order of 24000–48000 rpm.

8. A machine tool as claimed in claim 7 having two driven shafts in the form of spindles adapted to carrying routing tools.

9. A machine tool as claimed in claim 7 wherein the driving pulley comprises a casting consisting of a cylindrical circumferential portion, an axially offset hub and a conical web joining the cylindrical portion and hub.

10. A machine tool as claimed in claim 7 wherein the motor is mounted on a slide and a biasing spring acts on the slide to tension the poly-vee belt.

11. A machine tool as claimed in claim 7 wherein the or each driven shaft is arranged to be driven axially by a pneumatic cylinder.

* * * * *